US012807541B2

(12) United States Patent
Stavrulov et al.

(10) Patent No.: US 12,807,541 B2
(45) Date of Patent: Nov. 24, 2026

(54) METHOD FOR MAKING A WATER/GYPSUM MIXTURE

(71) Applicant: Amatec Inc., Newark, NJ (US)

(72) Inventors: Igor Anatolevich Stavrulov, Moscow (RU); Mohsen Zehtabchian, Toronto (CA)

(73) Assignee: Amatec Inc., Newark, NJ (US)

( * ) Notice: Subject to any disclaimer, the term of this patent is extended or adjusted under 35 U.S.C. 154(b) by 372 days.

(21) Appl. No.: 18/548,453

(22) PCT Filed: Apr. 28, 2023

(86) PCT No.: PCT/RU2023/000126

§ 371 (c)(1),
(2) Date: Aug. 30, 2023

(87) PCT Pub. No.: WO2024/219989

PCT Pub. Date: Oct. 24, 2024

(65) Prior Publication Data

US 2025/0084005 A1 Mar. 13, 2025

(30) Foreign Application Priority Data

Apr. 20, 2023 (RU) ........................... RU2023110155

(51) Int. Cl.
*C04B 40/00* (2006.01)
*B28C 7/04* (2006.01)
*C04B 11/00* (2006.01)
*C04B 40/02* (2006.01)

(52) U.S. Cl.
CPC ........ *C04B 40/0032* (2013.01); *B28C 7/0413* (2013.01); *C04B 11/00* (2013.01); *C04B 40/0277* (2013.01)

(58) Field of Classification Search
CPC .... B01F 15/0266; B01F 7/26; B01F 15/0233; B01F 15/0276; B01F 15/0292; B01F 15/0293; B01F 7/00766; B01F 3/12; B01F 23/235; B01F 35/21111; B01F 35/2134; B01F 35/83; C04B 11/00; C04B 38/10; C04B 2111/40; C04B 28/14; C04B 40/0032; C04B 40/0277; C04B 2111/0062; C04B 2111/20; B28C 5/0881; B28C 5/1253; B28C 5/16; B28C 5/1269; B28C 5/006; B28C 5/06; B28C 5/388; B28C 5/02; B28C 7/024; B28C 5/386; B28C 5/00; B28B 1/50; B28B 17/023; G01F 1/8477; G01N 11/04; Y02W 30/91
USPC ........ 366/64, 96–99, 162.1, 6, 8, 18, 20, 35, 366/38, 51, 65, 102, 141, 168.1, 171.1, 366/172.1, 172.2, 181.7, 303–304, 366/315–317, 167.1–175.3, 183.2, 366/150.1–182.4; 156/39, 44
See application file for complete search history.

(56) References Cited

U.S. PATENT DOCUMENTS

| | | | | |
|---|---|---|---|---|
| 4,288,263 | A * | 9/1981 | Delcoigne | B28B 5/027 264/257 |
| 8,016,960 | B2 * | 9/2011 | Wittbold | C04B 28/14 156/39 |
| 10,717,059 | B2 * | 7/2020 | Scaff | B28C 7/126 |
| 12,521,907 | B2 * | 1/2026 | Jaffel | B28C 5/386 |
| 2006/0244183 | A1 * | 11/2006 | Wittbold | B01F 33/8212 264/426 |
| 2018/0333691 | A1 * | 11/2018 | Scaff | B28C 5/1238 |
| 2025/0084005 | A1 * | 3/2025 | Stavrulov | C04B 40/0032 |

FOREIGN PATENT DOCUMENTS

| | | | | |
|---|---|---|---|---|
| AU | 2018219975 A1 * | 3/2019 | | C04B 38/10 |
| RU | 2766985 C1 | 3/2022 | | |
| SU | 921460 A3 | 4/1982 | | |
| WO | WO-2024219989 A1 * | 10/2024 | | C04B 28/14 |

* cited by examiner

*Primary Examiner* — Charles Cooley
(74) *Attorney, Agent, or Firm* — Nixon & Vanderhye PC

(57) ABSTRACT

Continuous industrial manufacturing of water/gypsum mixture at critically low water/gypsum ratio while maintaining high fluidity of the mixture is enabled. Continuous manufacturing water/gypsum mixture at a water/gypsum ratio of less than 0.25:1 is implemented by using a portion of the mixture as a transport medium for introducing new batches of liquid and dry components and includes: pre-mixing a flow of fluid water/gypsum mixture and dry components; obtaining, in the mixer, a finished water/gypsum mixture with the specified water/gypsum ratio by intensively mixing the pre-mixed dry components and fluid water/gypsum mixture flow; releasing a portion of the finished water/gypsum mixture flow from the process cycle and returning the remaining portion of the finished water/gypsum mixture to the mixing process as a transport medium for introducing new components; and obtaining a fluid water/gypsum mixture flow after adding liquid components to the remaining portion of the water/gypsum mixture flow with subsequent mixing.

6 Claims, 1 Drawing Sheet

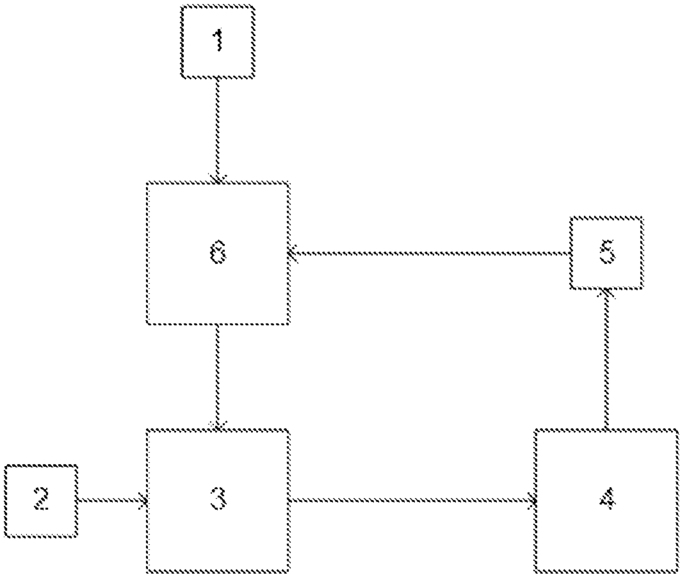
1
6
5
2
3
4

METHOD FOR MAKING A WATER/GYPSUM MIXTURE

CROSS-REFERENCE TO RELATED APPLICATIONS

This application is the U.S. national phase of International Application No. PCT/RU2023/000126 filed Apr. 28, 2023, which designated the U.S. and claims priority to RU 2023110155 filed Apr. 20, 2023, the entire contents of each of which are hereby incorporated by reference.

TECHNICAL FIELD

The invention refers to the gypsum industry and the construction industry, in particular to a method for obtaining a water/gypsum mixture used to manufacture gypsum products.

PRIOR ART

The prior art discloses various methods for obtaining a water/gypsum mixture (SU921460A3 published on Apr. 15, 1982; RU2766985C2 published on Mar. 16, 2022) which, in essence, involve dispensing the initial components into the mixer, mixing the initial components to produce a homogeneous mixture and feeding the homogeneous mixture to mold the products. These methods can be used for high water/gypsum ratios of approximately more than 0.3:1 in case of alpha-hemihydrate gypsum and more than 0.5:1 in case of beta-hemihydrate gypsum. Lower water/gypsum ratios prevent the required quality of mixing. There is no industrial method for continuous manufacturing of water/gypsum mixture at lower water/gypsum ratios. This is what constitutes a disadvantage of the known methods.

Therefore, the claimed method has no direct analogues because, currently, there is no stage involving a partial return of the finished water/gypsum mixture into the mixing process and its use as a transport medium for introducing new components, which enable achieving the claimed technical objectives and the claimed result.

SUMMARY OF THE INVENTION

The objective of the claimed invention is to develop a method for continuous manufacturing of water/gypsum mixture on industrial scale with water/gypsum ratio of less than 0.25:1, which will ensure high density and, hence, increased strength characteristics of gypsum products, while maintaining high fluidity of water/gypsum mixture.

The technical result of the invention is continuous industrial manufacturing of water/gypsum mixture at critically low water/gypsum ratio while maintaining high fluidity of the mixture.

The said technical result is achieved by using an already prepared water/gypsum mixture, which is partially left in the process, as a transport medium for introducing new portions of raw materials to the process. First, a portion of liquid is introduced into the water-gypsum mixture, and we will hereinafter refer to this mixture as a fluid water-gypsum mixture. New portions of dry materials are then added into the aforementioned mixture. Therefore, the system continuously circulates a flow of water-gypsum mixture, where new components are constantly introduced, and a finished mixture is continuously released from the mixer in an amount equal to the amount of introduced new components.

Hereinafter, the flow is understood as a continuous movement of a certain mass of substance for a certain unit of time, which can be specified both in weight units and in mass percentages. To avoid limiting the scope of consideration, no unit of time is defined hereinafter, since this method can be implemented at any process capacity.

The said technical result is achieved by continuous manufacturing of water/gypsum mixture at water/gypsum ratio of less than 0.25:1, which involves moving the mixture of liquid and dry components within a continuous process cycle in stages . . . a-b-c-d-e-a-b-c-d-e-a . . . , including the following stages:

a. introducing new dry components into the flow of the fluid water/gypsum mixture, before feeding it into the mixer;
b. obtaining, in the mixer, a finished water/gypsum mixture with the required water/gypsum ratio, by intensively mixing the flows of dry components and fluid water/gypsum mixture flow pre-mixed at stage a);
c. releasing a portion of the finished water/gypsum mixture flow after stage b) from the process cycle as a ready-for-use product;
d. returning the rest of the finished water/gypsum mixture flow to the mixing process at subsequent stages as a transport flow continuously circulating through all stages;
e. adding new liquid components to the returnable retained portion of the finished water/gypsum mixture flow to obtain a fluid water/gypsum mixture flow for mixing and subsequent transition to the stage a), In this case, the amount of dry and liquid components, the amount of released and remaining finished water/gypsum mixture flows is determined by the formula (1), and the required water/gypsum ratio is achieved by mixing the initial components and is determined by the formula (2):

$$df+(wf+rf)=rf+mf, \tag{1}$$

where 'df' is the dry components flow introduced at stage a); 'wf' is the liquid components flow introduced at stage e); 'rf' is the water/gypsum mixture flow retained in the cycle at stage d) and fed for watering at stage e); 'mf' is the finished water/gypsum mixture flow released from the cycle at stage c).

$$R=(wf-wfd)/(df-dfd), \tag{2}$$

where 'R' is water/gypsum ratio, 'wfd' is the dry portion flow in the liquid components; 'dfd' is the dry components flow other than gypsum.

This continuous cyclic process implies a start-up mode which brings the system operation mode to the required capacity indicators and which has the following differences from the main process:

- the cyclic process starts only with liquid components or a pre-made mixture of liquid and dry components at a desired fluidity of the mixture with a higher water/gypsum ratio;
- the liquid components are not introduced in step e) until the required level of water/gypsum ratio of the circulating flow is reached in the system;

at system start-up, a substandard water/gypsum mixture with a higher water/gypsum ratio is temporarily released in stage c).

This continuous cyclic process implies a start-stop operation mode, which ensures that the finished product is no longer released but the entire system remains in continuous process operation while maintaining the required capacity indicators, and which has the following differences from the main process:

coordinated ending of liquid and dry components introduction which leads to stopping the release of the finished product—the "stop" mode;

coordinated start of dry and liquid components introduction which leads to starting the release of the finished product—the "start" mode.

This cyclic process implies a shutdown mode, which ensures stopping the release of the finished product and cleaning the system before completely shutting it down:

coordinated ending of liquid and dry components introduction;

release of the entire circulating flow as a finished product;

feeding water into the system in order to flush the entire system.

The water/gypsum mixture can be made at the system pressure of up to 10 atm or more.

The water/gypsum mixture can be made in the system under vacuum with absolute pressure of 0.1 atm (overpressure of −0.9 atm) or less.

BRIEF DESCRIPTION OF THE DRAWINGS

The invention will become clearer from the description, which is not restrictive and is provided with reference to the accompanying drawings, which show the following:

FIG. 1—Block diagram of the claimed process along with indication of all stages

1—Metered feeding of liquid components; 2—Metered feeding of dry components; 3—Stage of pre-mixing fluid water/gypsum mixture and dry components; 4—Main mixing stage for obtaining finished water/gypsum mixture; 5—Stage of removing a portion of the finished water/gypsum mixture and returning the remaining portion to the process; 6—Stage of obtaining fluid water/gypsum mixture.

EMBODIMENT OF THE INVENTION

The claimed method for continuous manufacturing of water/gypsum mixture at water/gypsum ratio of less than 0.25:1, preferably in the range (0.1-0.23):1, based on moving the flow of mixed liquid and dry components within the process cycle, which is carried out in a system that ensures consistent continuous cyclic performance of the following process operations: stage (3) of pre-mixing fluid water/gypsum mixture and dry components, main mixing stage (4) for obtaining finished water/gypsum mixture, stage (5) of removing a portion of finished water/gypsum mixture and returning the remaining portion of the finished product to the process cycle and stage (6) of obtaining fluid water/gypsum mixture to be directed further within the cycle.

Therefore, the system continuously moves in cycles the flow of water/gypsum mixture, where new portions of liquid and dry components are introduced in succession, and a portion of the finished water/gypsum mixture is released from the mixer to be sent for subsequent use.

The required water/gypsum ratio is obtained by setting the flow parameters of dry and liquid components in accordance with formula (2).

The mixer capacity is determined by the formula (3):

$$MC=(df+wf+rf), \tag{3}$$

where 'MC' is the mixer capacity; 'df' is the dry components flow; 'wf' is the liquid components flow; and 'rf' is the water/gypsum mixture flow retained in the cycle.

The finished water/gypsum mixture is released from the mixer (4) and fed to stage (5) for releasing finished water/gypsum mixture, where a portion of the finished water/gypsum mixture flow is released from the process cycle. The extent of releasing a portion of the finished water/gypsum mixture flow from the process cycle is determined by formula (4):

$$S=mf/rf, \tag{4}$$

where 'S' is the extent of releasing a portion of the finished water/gypsum mixture flow from the process cycle; 'mf' is the water/gypsum mixture flow to be released from the cycle; 'rf' is the water/gypsum mixture flow to be retained in the cycle.

Depending on the quality characteristics of the used raw materials and the required 'R', the parameter 'S' is in the range of 0.01-2, mostly within the range of 0.2-0.5.

The flow 'mf' of finished water/gypsum mixture released from the process cycle determines the capacity of the process and the capacity of the mixing system, the amount of which is determined by the following formula:

$$mf=df+wf, \tag{5}$$

where 'mf' is the finished water/gypsum mixture flow released from the process; 'df' is the dry components flow introduced into the system; 'wf' is the liquid components flow introduced into the system.

The portion of finished water/gypsum mixture remaining after stage (5) is fed to stage (6) for obtaining fluid water/gypsum mixture. To do this, such remaining portion of the water/gypsum mixture flow receives a metered feeding (1) of liquid components from the feeding device, which ensures the creation of the required liquid component flow.

Next, the fluid water/gypsum mixture is fed from stage (6) to stage (3) to pre-mix fluid water/gypsum mixture and dry components, where a metered feeding of dry components (2) is made into the said mixture in the form of a specified flow.

The said process stages are uninterrupted and continuously cyclical.

Gypsum hemihydrate is used as the main dry component. Additional dry ingredients may include limestone, slaked lime, unslaked lime, dry plasticizer, dry retarders/accelerators of gypsum hydration, dry substances affecting the process of gypsum crystallization, shape of crystallites and their bonds, dry substances displacing air from the liquid mixture, sand, gypsum dihydrate, gypsum anhydrite, and other components such as inert filler.

Water is used as the main liquid component. Additional liquid components may include liquid plasticizer, liquid retarders/accelerators of gypsum hydration process, liquid substances affecting the process of gypsum crystallization, shape of crystallites and their bonds, liquid substances displacing air from the liquid mixture.

In addition, the introduced liquid and dry components may include substances that do not change the said process of manufacturing the water/gypsum mixture but, in one way or another, modify the properties of the resulting gypsum products or adjust the parameters of the finished mixture; this may be, for example, fibers, hydrophobic mixtures, colorants, aromatic additives, gypsum hardening retarders/accelerators and similar components. The introduction of such substances cannot be viewed as an improvement or modification of this method.

The start-up mode for the process cycle is provided by using liquid components or a mixture of liquid and dry components, which ensure the desired fluidity of the mixture with a higher water/gypsum ratio, and the said flow circulates through the process cycle, with no liquid components introduced into the said flow and with dry components introduced until achieving the specified water/gypsum ratio. If the volume of water/gypsum mixture flow increases, a portion of the said flow volume is released at the stage (5) of removing the finished water/gypsum mixture, and the mixture is released from the cycle with a higher water/gypsum ratio than the required value. This mixture can be fed into a storage tank, from which it will be later introduced back into the flow. Or the mixture can be disposed of.

After reaching the required water/gypsum ratio in the process cycle, the system goes from the start-up mode into the operation mode.

If needed, the system can be switched into the start-stop mode to stop the release of the finished water/gypsum mixture for a short time by ending, in a coordinated manner, the liquid and dry components introduction, which will end the release of the finished water/gypsum mixture from the process cycle at stage (5). In this mode, the water/gypsum mixture continues to circulate within the process cycle. With coordinated start of liquid and dry components introduction, the system starts to release the finished product.

The water/gypsum mixture can be manufactured at the pressure of up to 10 atm. The said pressure is created by feeding liquid and/or dry components under pressure into the system while limiting the finished water/gypsum mixture flow released from the process cycle, and/or limiting the finished water/gypsum mixture flow fed for watering, and/or limiting the fluid finished water/gypsum mixture flow, and/or limiting the finished water/gypsum mixture flow after the mixer. The pressure may be required both to operate the equipment used after the mixing process and to obtain water/gypsum mixture with the required characteristics.

A water/gypsum mixture can be manufactured under vacuum with absolute pressure of 0.1 or less. The said pressure is created by feeding pre-deaerated liquid and/or dry components into the system under vacuum and maintaining vacuum in the process by limiting the finished water/gypsum mixture flow released from the process cycle, and/or limiting the finished water/gypsum mixture flow fed for watering, and/or limiting the fluid finished water/gypsum mixture flow, and/or limiting the finished water/gypsum mixture flow after the mixer. The vacuum may be required both to operate the equipment used after the mixing process and to obtain a finished deaerated high-density water/gypsum mixture containing no air bubbles.

It is possible to manufacture water/gypsum mixture with water content which will be less than the amount necessary for complete gypsum hydration (approximately less than 0.18:1). This value is based on the content of gypsum hemihydrate, a chemical substance found in the gypsum raw material, which can range from 98% to 80% or less. In this case, the resulting products will contain both hydrated gypsum and residual hemihydrate. To complete the manufacturing of such products, they must be subjected to additional humidification, which will result in complete hydration of hemihydrate in the finished product.

Example 1

To obtain a water/gypsum ratio of 0.2:1, a flow of fluid water/gypsum mixture and gypsum hemihydrate is mixed with the required dry additives. To do this, the stage (3) of pre-mixing the fluid water/gypsum mixture and dry components includes a metered feeding (2) of dry components, as a result of which a gypsum hemihydrate flow in the amount of 5 weight % (wt % next) is fed into the said mixture.

Next, the fluid water/gypsum mixture flow, which contains the added gypsum hemihydrate is fed into the mixer (4) for obtaining a finished water/gypsum mixture, where the said flow is mixed to obtain homogeneous water/gypsum mixture with the ratio of 0.2:1.

Next, the finished water/gypsum mixture is released from the mixer (4) and fed to stage (5) for releasing finished water/gypsum mixture, where a portion of the finished water/gypsum mixture flow is released from the process cycle in the amount of 6 wt %. After that, the remaining portion of the finished water/gypsum mixture is fed to the stage (6) for obtaining fluid water/gypsum mixture, which is obtained by a metered feeding (1) of water in the amount of 1 wt % into the remaining portion of the water/gypsum mixture flow. Next, the process continues in accordance with the cycle.

Example 2

Example 2 differs from example 1 in that the water/gypsum mixture is obtained with the water/gypsum ratio of 0.25:1. To do this, a gypsum hemihydrate flow in the amount of 4 wt % is fed into the said mixture, and a portion of the finished water/gypsum mixture flow is released from the process cycle in the amount of 5 wt %, and a metered feeding of (1) water in the amount of 1 wt % is provided to the remaining portion of the water/gypsum mixture flow.

Example 3

Example 3 differs from example 1 in that the water/gypsum mixture is obtained with the water/gypsum ratio of 0.18:1. To do this, a gypsum hemihydrate flow in the amount of 5.556 wt % is fed into the said mixture, and a portion of the finished water/gypsum mixture flow is released from the process cycle in the amount of 6.556 wt %, and a metered feeding of (1) water in the amount of 1 wt % is provided to the remaining portion of the water/gypsum mixture flow.

The invention has been described above with reference to a specific embodiment. Other embodiments of the invention that do not change the essence of the invention as disclosed in this description may also be apparent to those skilled in the art. Accordingly, the invention should be considered limited in scope only by the claims below.

The invention claimed is:

1. A method for continuous manufacturing of a water/gypsum mixture having a specified water-to-gypsum ratio of less than 0.25:1 in connection with a process cycle, the method comprising:

a. pre-mixing a flow of a fluid water/gypsum mixture with a metered flow of dry components to form a pre-mixed composition;

b. feeding the pre-mixed composition into a mixer and mixing it to obtain a homogeneous water/gypsum mixture having the specified water-to-gypsum ratio;

c. releasing a portion of the homogeneous water/gypsum mixture obtained in step (b) from the process cycle as a finished product flow;

d. returning a remaining portion of the homogeneous water/gypsum mixture obtained in step (b) to the process cycle for recirculation; and e. forming a new fluid water/gypsum mixture by adding a metered flow of liquid components to the returned remaining portion obtained in step (d) to prepare the fluid water/gypsum mixture for a next repetition of step (a);

wherein the flows of dry components (df), liquid components (wf), returned homogeneous water/gypsum mixture (rf), and released homogeneous water/gypsum mixture (mf) satisfy the relationship:

$$df+(wf+rf)=rf+mf, \qquad (1)$$

and the required water-to-gypsum ratio (R) is defined by:

$$R=(wf-wfd)/(df-dfd), \qquad (2)$$

where 'R' is water/gypsum ratio; 'wfd' is the dry portion flow in the liquid components; and 'dfd' is the dry components flow other than gypsum.

2. The method of claim 1, wherein the water/gypsum mixture is manufactured in step (b) at a pressure of up to 10 atm.

3. The method of claim 1, wherein the water/gypsum mixture is manufactured in step (b) under vacuum with an absolute pressure of 0.1 atm or less.

4. The method of claim 1, further comprising additionally humidifying manufacturing products from the water/gypsum mixture that have a water content less than an amount necessary for gypsum hydration.

5. The method of claim 1, wherein the process cycle is cyclic and includes a startup mode that brings the process cycle to required capacity indicators, and wherein the cyclic process starts only with the liquid components or with a pre-made mixture of the liquid and dry components at a desired fluidity with a water-to-gypsum ratio higher than the specified water-to-gypsum ratio, and the liquid components are not introduced in step (e) until the specified water-to-gypsum ratio is reached.

6. The method of claim 1, wherein the process cycle is cyclic and includes a start-stop operation mode in which release of the finished product flow is stopped while the process cycle remains in continuous operation at required capacity indicators, the start-stop operation mode including: coordinated ending of an introduction of the liquid and dry components to stop release of the finished product flow and switch to a stop mode, and coordinated starting of the introduction of the liquid and dry components to start release of the finished product flow and switch to a start mode.

* * * * *